(12) United States Patent
Seri et al.

(10) Patent No.: US 12,549,573 B2
(45) Date of Patent: *Feb. 10, 2026

(54) TECHNIQUES FOR AGGREGATING MITIGATION ACTIONS

(71) Applicant: Zafran Security LTD, Tel Aviv (IL)

(72) Inventors: Ben Seri, Ramat Gan (IL); Snir Havdala, Tel Aviv (IL)

(73) Assignee: Zafran Security LTD, Tel Aviv (IL)

( * ) Notice: Subject to any disclaimer, the term of this patent is extended or adjusted under 35 U.S.C. 154(b) by 143 days.

This patent is subject to a terminal disclaimer.

(21) Appl. No.: 18/662,465

(22) Filed: May 13, 2024

(65) Prior Publication Data

US 2025/0300996 A1 Sep. 25, 2025

Related U.S. Application Data

(63) Continuation of application No. 18/612,618, filed on Mar. 21, 2024, now Pat. No. 12,095,787.

(51) Int. Cl.
*H04L 9/40* (2022.01)

(52) U.S. Cl.
CPC ...... *H04L 63/1416* (2013.01); *H04L 63/1433* (2013.01); *H04L 63/1466* (2013.01)

(58) Field of Classification Search
CPC .................. H04L 63/1416; H04L 63/1466
USPC .......................................................... 726/22
See application file for complete search history.

(56) References Cited

U.S. PATENT DOCUMENTS

| | | |
|---|---|---|
| 9,058,492 B1 | 6/2015 | Satish |
| 9,117,069 B2 | 8/2015 | Oliphant et al. |
| 9,306,965 B1 | 4/2016 | Grossman et al. |
| 9,680,855 B2 * | 6/2017 | Schultz ............... G09C 1/00 |
| 9,792,443 B1 | 10/2017 | Sheridan et al. |
| 9,967,279 B2 * | 5/2018 | Chesla ............... H04L 63/20 |
| 9,977,905 B2 | 5/2018 | Li |
| 9,979,753 B2 | 5/2018 | Chesla |
| 10,038,715 B1 | 7/2018 | Majkowski et al. |
| 10,102,533 B2 | 10/2018 | Barday |
| 10,187,422 B2 * | 1/2019 | Akcin ............... H04L 63/20 |

(Continued)

FOREIGN PATENT DOCUMENTS

CN 102222041 A 10/2011

OTHER PUBLICATIONS

"NSA'S Top Ten Cybersecurity Mitigation Strategies", obtained online from , retrieved on Apr. 19, 2025. (Year: 2018).

(Continued)

*Primary Examiner* — Badri Narayanan Champakesan
(74) *Attorney, Agent, or Firm* — M&B IP Analysts, LLC

(57) ABSTRACT

A system and method for mitigating cyber threats. A method includes aggregating a plurality of mitigation actions into at least one mitigation action set with respect to at least one security control, wherein each mitigation action set includes a respective subset of the plurality of mitigation actions corresponding to a respective security control of the at least one security control; and performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

18 Claims, 7 Drawing Sheets

(56) References Cited

U.S. PATENT DOCUMENTS

| | | | |
|---|---|---|---|
| 10,250,619 | B1 | 4/2019 | Park et al. |
| 10,282,550 | B1 | 5/2019 | Sheridan et al. |
| 10,496,803 | B2 | 12/2019 | Barday et al. |
| 10,546,134 | B2 | 1/2020 | Abdine et al. |
| 10,558,809 | B1* | 2/2020 | Joyce ............... G06N 5/046 |
| 10,609,063 | B1 | 3/2020 | Oliphant et al. |
| 10,754,958 | B1 | 8/2020 | Sidagni |
| 10,873,595 | B1 | 12/2020 | Oliphant et al. |
| 10,893,066 | B1 | 1/2021 | Oliphant et al. |
| 11,012,466 | B2 | 5/2021 | Gilmore et al. |
| 11,431,740 | B2* | 8/2022 | Heckman ............... H04L 63/20 |
| 11,475,023 | B2 | 10/2022 | Gould et al. |
| 11,483,332 | B2 | 10/2022 | Crabtree et al. |
| 11,516,222 | B1 | 11/2022 | Srinivasan et al. |
| 11,533,332 | B2* | 12/2022 | Engelberg ............. H04L 63/145 |
| 11,539,720 | B2* | 12/2022 | Reybok, Jr. ......... H04L 63/1433 |
| 11,757,923 | B1 | 9/2023 | Vandeventer et al. |
| 11,848,956 | B2* | 12/2023 | Shua ..................... G06F 21/554 |
| 11,874,932 | B2 | 1/2024 | Chapman et al. |
| 12,095,787 | B1 | 9/2024 | Seri et al. |
| 12,107,869 | B1 | 10/2024 | Kannan et al. |
| 12,177,243 | B1 | 12/2024 | Steers |
| 2006/0101517 | A1 | 5/2006 | Banzhof et al. |
| 2008/0209563 | A1 | 8/2008 | Rogers et al. |
| 2009/0307777 | A1* | 12/2009 | He ......................... G06F 21/55 726/25 |
| 2010/0198636 | A1 | 8/2010 | Choudhary et al. |
| 2013/0191919 | A1 | 7/2013 | Basavapatna et al. |
| 2013/0247205 | A1 | 9/2013 | Schrecker et al. |
| 2014/0020092 | A1 | 1/2014 | Davidov |
| 2014/0137257 | A1 | 5/2014 | Martinez et al. |
| 2015/0033287 | A1 | 1/2015 | Oliphant et al. |
| 2015/0040232 | A1 | 2/2015 | Oliphant et al. |
| 2016/0364229 | A1 | 12/2016 | Higginson et al. |
| 2017/0187743 | A1 | 6/2017 | Madou et al. |
| 2018/0181752 | A1 | 6/2018 | Guri et al. |
| 2018/0336356 | A1 | 11/2018 | Papaxenopoulos et al. |
| 2019/0384586 | A1 | 12/2019 | Jiang |
| 2020/0027096 | A1 | 1/2020 | Cooner |
| 2020/0162497 | A1 | 5/2020 | Iyer et al. |
| 2020/0228560 | A1 | 7/2020 | Murthy et al. |
| 2020/0252422 | A1 | 8/2020 | Davis et al. |
| 2020/0351294 | A1 | 11/2020 | Davis et al. |
| 2021/0273968 | A1 | 9/2021 | Shaieb et al. |
| 2021/0329025 | A1* | 10/2021 | Ganor .................... H04L 63/20 |
| 2021/0352099 | A1 | 11/2021 | Rogers |
| 2021/0390182 | A1* | 12/2021 | Boutnaru ................ G06F 21/52 |
| 2022/0078210 | A1* | 3/2022 | Crabtree ............. G06F 16/9024 |
| 2022/0109681 | A1 | 4/2022 | Hamdi |
| 2022/0131888 | A1 | 4/2022 | Kanso et al. |
| 2022/0179967 | A1 | 6/2022 | Karlsson et al. |
| 2022/0210200 | A1* | 6/2022 | Crabtree ............... G06F 16/951 |
| 2022/0286474 | A1 | 9/2022 | Kuppa et al. |
| 2022/0345477 | A1 | 10/2022 | Criscione |
| 2023/0088197 | A1 | 3/2023 | Cline |
| 2023/0222222 | A1 | 7/2023 | Pagnozzi et al. |
| 2023/0229788 | A1 | 7/2023 | Pieno et al. |
| 2023/0239317 | A1 | 7/2023 | Ganesan et al. |
| 2023/0259632 | A1* | 8/2023 | Marciano .............. G06F 21/577 726/25 |
| 2023/0283629 | A1* | 9/2023 | Boyer .................... H04L 41/16 726/22 |
| 2023/0344797 | A1* | 10/2023 | Filatov ................ H04L 63/0236 |
| 2023/0370486 | A1 | 11/2023 | Paquette et al. |
| 2023/0388346 | A1 | 11/2023 | Kulshreshtha et al. |
| 2024/0104192 | A1 | 3/2024 | Kalle et al. |
| 2024/0121259 | A1 | 4/2024 | Imrem et al. |
| 2024/0129318 | A1 | 4/2024 | Vandeventer et al. |
| 2024/0163312 | A1 | 5/2024 | Azad et al. |
| 2024/0248963 | A1 | 7/2024 | Parham et al. |
| 2024/0248995 | A1 | 7/2024 | Gazit et al. |
| 2024/0386099 | A1 | 11/2024 | Weizman et al. |
| 2024/0394383 | A1 | 11/2024 | Zettel, II et al. |
| 2025/0013754 | A1 | 1/2025 | Davidovich et al. |

OTHER PUBLICATIONS

International Search Report for PCT/IB2025/052901 dated Jun. 23, 2025. Searching Authority: Israel Patent Office, Jerusalem, Israel.

Written Opinion of the Searching Authority for PCT/IB2025/052901 dated Jun. 23, 2025. Searching Authority: Israel Patent Office, Jerusalem, Israel.

International Searching Authority for PCT/IB2024/055666, dated Sep. 16, 2024. International Searching Authority, Israel Patent Office, Jerusalem, Israel.

Written Opinion of the Searching Authority for PCT/IB2024/055666, dated Sep. 16, 2024. International Searching Authority, Israel Patent Office, Jerusalem, Israel.

Dissanayake, Nesara et al., "Software Security Patch Management—A Systematic Literature Review of Challenges, Approaches, Tools and Practices", Journal of Latex Templates Aug. 23, 2021.

Huszcza, Krysztof. "Reachable Vulnerabilities: How to Effectively Prioritize Open Source Security." Snyk, Aug. 18, 2020.

Rezilion, "Runtime Memory Analysis: a Better Way Forward for Vulnerability Management," 2019.

International Search Report for PCT/IB2024/055667, dated Oct. 1, 2024. Searching Authority, Israel Patent Office, Jerusalem, Israel.

Written Opinion of the Searching Authority for PCT/IB2024/055667, dated Oct. 1, 2024. Searching Authority, Israel Patent Office, Jerusalem, Israel.

* cited by examiner

TECHNIQUES FOR AGGREGATING MITIGATION ACTIONS

CROSS REFERENCE FROM RELATED APPLICATION

This application is a continuation of U.S. patent application Ser. No. 18/612,618 filed on Mar. 21, 2024, now pending, the contents of which are hereby incorporated by reference.

TECHNICAL FIELD

The present disclosure relates generally to mitigation of cyber threats, and more specifically to optimizing cyber threat mitigation.

BACKGROUND

As organizations providing and utilizing computing services grow, so do their cybersecurity needs. In particular, increased use of computing resources can result in exponentially more cybersecurity issues in daily operations. As a result, the number of indicators of cyber threats such as security policy violations and anomalies which might need mitigation can become unwieldy.

Failure to address potential cyber threats can allow those threats to succeed, thereby causing significant harm in forms such as downtime, stolen data, improper access to services, and the like. Thus, solutions which aid in maximizing the number of cyber threats that can be mitigated are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for mitigating cyber threats. The method comprises: aggregating a plurality of mitigation actions into at least one mitigation action set with respect to at least one security control, wherein each mitigation action set includes a respective subset of the plurality of mitigation actions corresponding to a respective security control of the at least one security control; and performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

Certain embodiments disclosed herein also include a non-transitory computer readable medium having stored thereon causing a processing circuitry to execute a process, the process comprising: aggregating a plurality of mitigation actions into at least one mitigation action set with respect to at least one security control, wherein each mitigation action set includes a respective subset of the plurality of mitigation actions corresponding to a respective security control of the at least one security control; and performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

Certain embodiments disclosed herein also include a system for mitigating cyber threats. The system comprises: a processing circuitry; and a memory, the memory containing instructions that, when executed by the processing circuitry, configure the system to: aggregating a plurality of mitigation actions into at least one mitigation action set with respect to at least one security control, wherein each mitigation action set includes a respective subset of the plurality of mitigation actions corresponding to a respective security control of the at least one security control; and performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

Certain embodiments disclosed herein include the method, non-transitory computer readable medium, or system noted above, further including or being configured to perform the following step or steps: grouping the plurality of mitigation actions into a plurality of candidate mitigation action sets; simulating the plurality of candidate mitigation action sets, wherein simulating the plurality of candidate mitigation action sets yields a set of simulation results; and selecting the at least one mitigation action set from among the plurality of candidate mitigation action sets based on the set of simulation results.

Certain embodiments disclosed herein include the method, non-transitory computer readable medium, or system noted above, further including or being configured to perform the following step or steps: for each of the plurality of candidate mitigation action sets: determining a configuration and a deployment of a first security control of the at least one security control for the candidate mitigation action set; and determining a degree of risk reduction for the candidate mitigation action set based on the determined configuration and the determined deployment of the first security control; and determining a risk score for the candidate mitigation action set based on the determined degree of risk reduction for the candidate mitigation action set; wherein the simulation results include the risk score determined for each of the plurality of candidate mitigation action sets.

Certain embodiments disclosed herein include the method, non-transitory computer readable medium, or system noted above, wherein the risk score determined for each candidate mitigation action set is determined based further on at least one risk amplifier of a computing environment for which the plurality of mitigation actions is to be performed.

Certain embodiments disclosed herein include the method, non-transitory computer readable medium, or system noted above, further including or being configured to perform the following step or steps: determining an impact score for each of the plurality of candidate mitigation action sets, wherein the impact score for each candidate mitigation action set indicates a degree of impact of the candidate mitigation action set on at least one other computing entity, wherein the at least one mitigation action set is selected based further on the impact score determined for each of the plurality of candidate mitigation action sets.

Certain embodiments disclosed herein include the method, non-transitory computer readable medium, or system noted above, wherein the at least one mitigation action set is selected based on further on an efficiency of each of the plurality of candidate mitigation action sets.

Certain embodiments disclosed herein include the method, non-transitory computer readable medium, or system noted above, wherein the at least one mitigation action set is a plurality of mitigation action sets, wherein the plurality of mitigation action sets corresponds to a plurality of respective assets, further including or being configured to perform the following step or steps: prioritizing the plurality of mitigation action sets based on a predetermined operations criticality of each of the plurality of respective assets.

Certain embodiments disclosed herein include the method, non-transitory computer readable medium, or system noted above, further including or being configured to perform the following step or steps: determining at least one mitigation action of the plurality of mitigation actions which has already been performed; and removing the at least one mitigation action which has already been performed from the at least one mitigation action set.

Certain embodiments disclosed herein include the method, non-transitory computer readable medium, or system noted above, wherein the subset of the plurality of mitigation actions for a first mitigation action set of the at least one mitigation action includes blocking a plurality of Internet Protocol addresses, wherein the set of instructions sent for the first mitigation action set causes the respective security control to block each of the plurality of Internet Protocol addresses.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include techniques for aggregating mitigation actions. More specifically, the embodiments discussed herein allow for efficiently mitigating potential cyber threats by aggregating mitigation actions with respect to security controls used to effectuate mitigation. To this end, various disclosed embodiments include methods for optimizing sets of mitigation actions with respect to a target balance of efficiency and risk in order to improve security of a computing environment in which the controls are deployed. The disclosed embodiments also include techniques for simulating risks for mitigation action sets which may be utilized for optimization.

In an embodiment, potential security controls (also referred to as "controls") are identified and used to determine sets of mitigation actions (also referred to as "mitigation action sets") which share one or more controls in common. The sets of mitigation actions are optimized for efficiency and potential adverse effects, and one or more optimized sets of mitigation actions are aggregated and performed. The aggregated mitigation actions may be performed by transmitting a set of instructions indicating activities to be performed for each of the aggregated mitigation actions for execution by a control. That is, aggregated mitigation actions may be performed in batches by sending a set of instructions for executing all of the mitigation actions to the same control or controls.

In some embodiments, different potential sets of mitigation actions may be simulated in order to analyze effectiveness of different combinations of actions with respect to a given control or set of controls. The simulation may include determining simulated deployments, configurations, or both, for a set of controls to be realized via each set of mitigation actions, and determining an applicable risk score which accounts for risk amplifiers as well as effects of the simulated controls. The simulations therefore provide a process for comparing effectiveness of different sets of mitigation actions, which in turn can be utilized to select optimal sets of mitigation actions for security purposes.

The disclosed embodiments allow for improving efficiency of mitigation actions used to mitigate potential cyber threats by batching mitigation actions with respect to controls such that a set of instructions may be sent to controls in order to realize the entire set of mitigation actions. Accordingly, the disclosed techniques allow for conserving computing resources used for mitigating cyber threats. Moreover, the disclosed techniques can be customized to achieve a target balance between efficiency and potential adverse effects. For example, sets of mitigation actions may be determined in order to maximize efficiency, to minimize risk, or anywhere in between, based on objective criteria which may be preconfigured and consistently applied across different sets of mitigation actions.

Figure 1A:
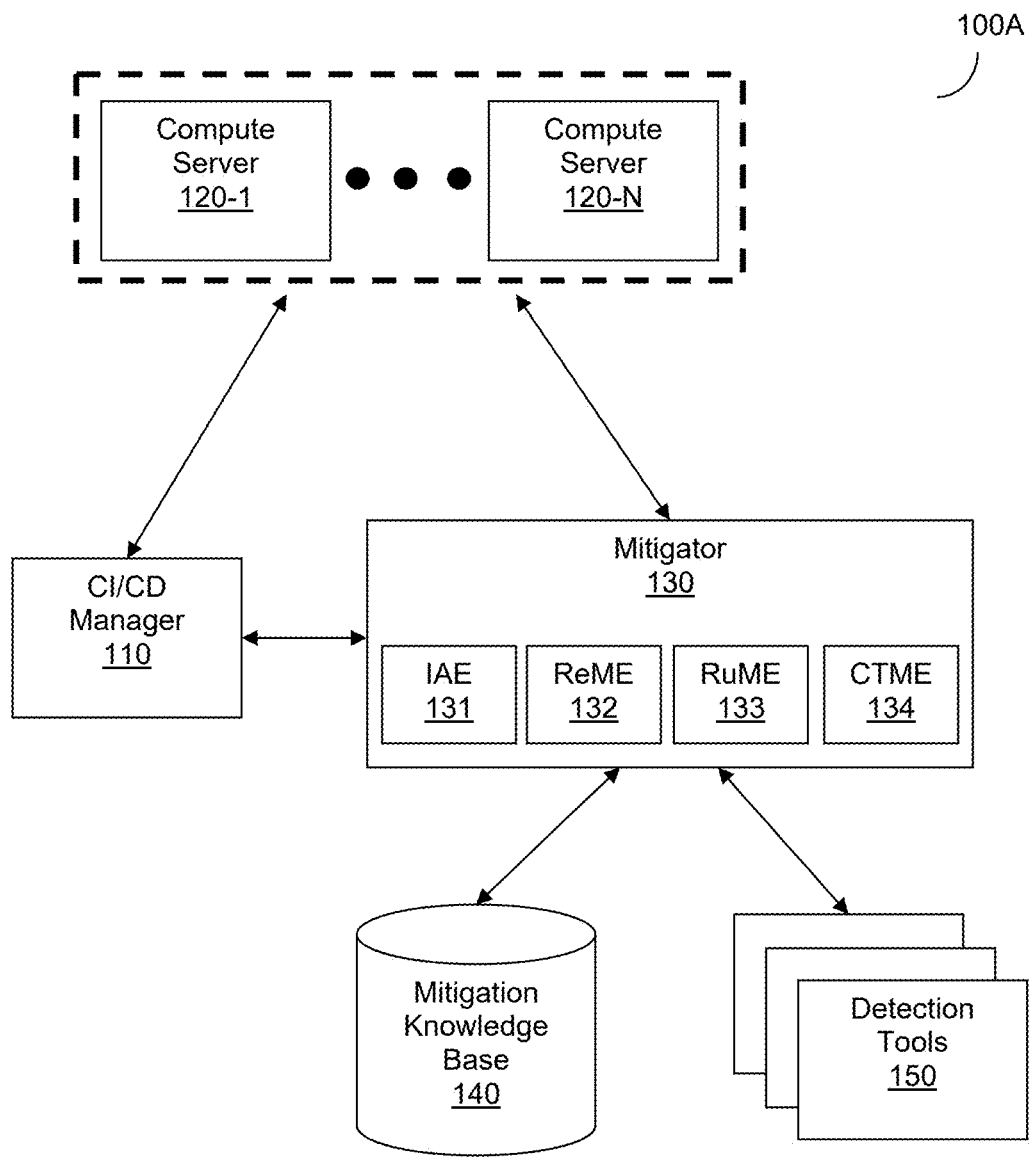
FIGS. 1A-B are network diagrams utilized to describe various disclosed embodiments.
Figure 1B:
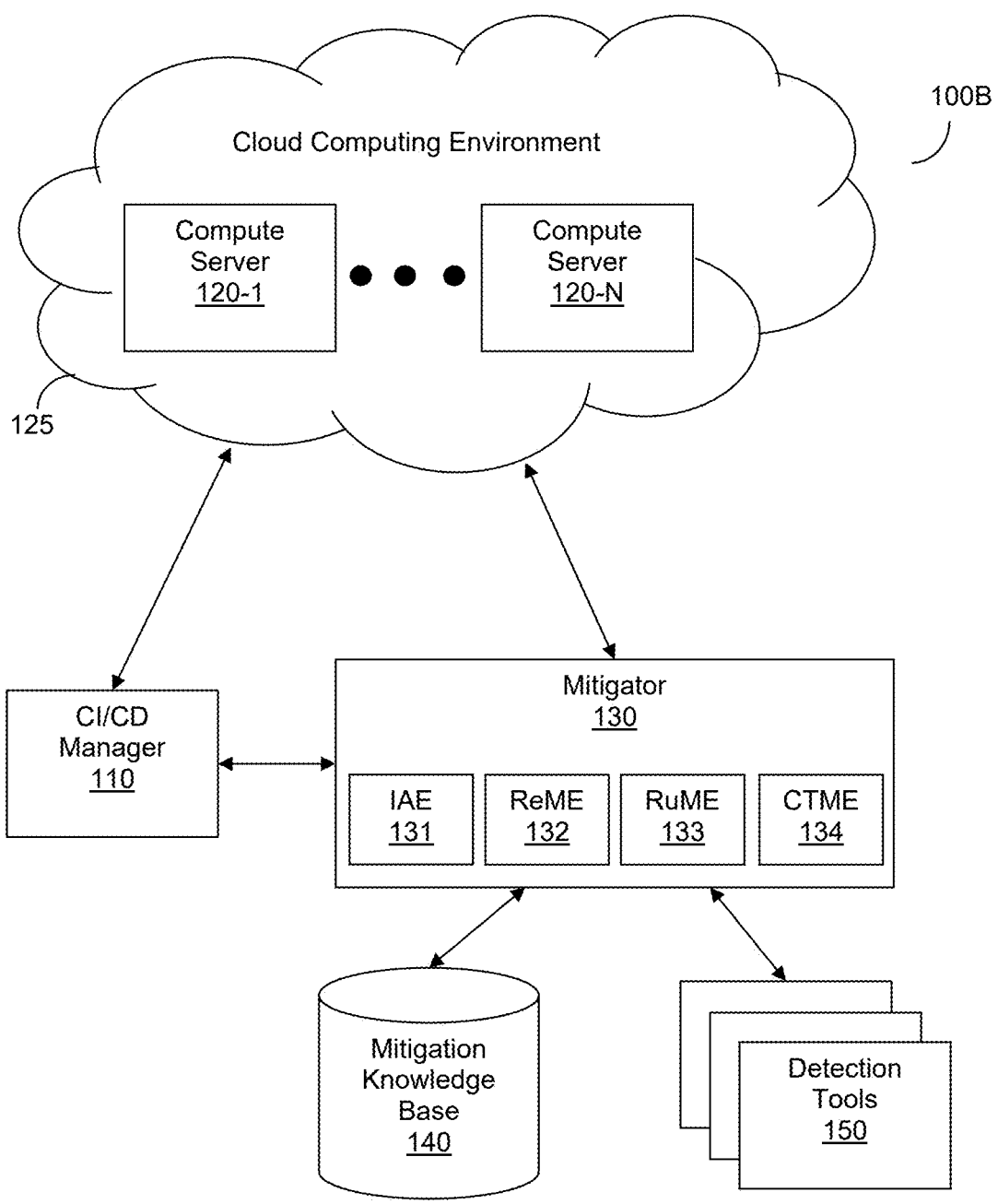

FIGS. 1A and 1B are example network diagrams 100A and 100B, respectively, utilized to describe various disclosed embodiments.

The network diagram 100A depicts an on-premises implementation in which a mitigator 130 is deployed on-premises with one or more compute servers 120-1 through 120-N (where N is an integer having a value equal to or greater than 1). As shown in the diagram 100A, the mitigator 130 communicates with a continuous integration/continuous development (CI/CD) manager 110, the compute servers 120, a mitigation knowledge base 140, and one or more detection tools 150.

The CI/CD manager 110 is configured to manage software components, hardware components, process components, and other parts of a computing infrastructure (not separately depicted) realized at least partially using the compute servers 120. To this end, the CI/CD manager 110 may be configured to deploy code uploaded by one or more developers (not shown), to enforce policies for the computing infrastructure (e.g., on the compute servers 120, both, and the like.

The compute servers 120 are configured to run processes and perform other activities pursuant to operation of the computing infrastructure in which they are deployed. In accordance with various disclosed embodiments, mitigation actions may be performed through the compute servers 120. In some embodiments, one or more artifacts are deployed in the compute servers 120, for example, as part of code deployed in the compute servers 120 via one or more code releases signed with the artifact as described herein. Accordingly, executable code of the artifact used to track and monitor mitigation activities as well as to perform sets of mitigation actions to be performed in aggregate as described herein may be stored on or otherwise accessed and executed by the computer servers 120 in order to perform at least a portion of the disclosed embodiments.

The mitigator 130 is configured to perform at least a portion of the disclosed embodiments including aggregating and performing mitigation actions, running simulations, and the like. To further support such performance, the mitigator 130 may be further configured to perform other activities such as, but not limited to, building a mitigation knowledge base 140 and performing impact analysis for vulnerable states.

To this end, the mitigator 130 may be configured with any or all of an impact analysis engine (IAE) 131, a reachability mitigation engine (ReME) 132, a runtime mitigation engine (RuME) 133, and a compile time mitigation engine (CTME) 134. The impact analysis engine 131 is configured to perform impact analysis. The engines 132, 133, and 134, are configured to perform mitigation actions related to reachability, runtime code modification, and compiler time code modification, respectively.

The mitigation knowledge base 140 defines possible mitigation actions to be performed by mitigation engines (e.g., any of the engines 132, 133, and 134) for different known vulnerable states. More specifically, the mitigation knowledge base 140 defines respective mitigation actions to be performed by each mitigation engine for different vulnerable states such as, but not limited to, vulnerable states defined in one or more common vulnerabilities and exposures (CVE, not shown). In some implementations, the mitigation knowledge base 140 may be built by one or more other systems (not shown).

The detection tools 150 include cybersecurity detection tools which are configured to detect potential vulnerable states such as, but not limited to, vulnerabilities and exposures. To this end, the detection tools 150 may be configured to generate and send alerts about any detected vulnerable states to the mitigator 130 for use in impact analysis, mitigation, both, and the like. The detection tools 150 may alert on the vulnerable states using definitions of the vulnerable states from a CVE such that different detection tools may alert on vulnerable states in a comparable manner. In at least some implementations, the mitigation actions to be aggregated and performed include mitigation actions for mitigating threats represented in the alerts or other violations output by the detection tools 150.

The network diagram 100B depicts a cloud-based implementation in which the compute servers 120 are deployed in a cloud computing environment 125. The mitigator 130, the CI/CD manager 110, or both, may be deployed outside of such a cloud computing environment 125 and may communicate with the compute servers 120 via one or more cloud networks, the Internet, or any other networks (not shown) utilized to enable communications with the compute servers 120. Such networks may include, but are not limited to, a wireless, cellular or wired network, a local area network (LAN), a wide area network (WAN), a metro area network (MAN), the Internet, the worldwide web (WWW), similar networks, and any combination thereof.

Figure 2:
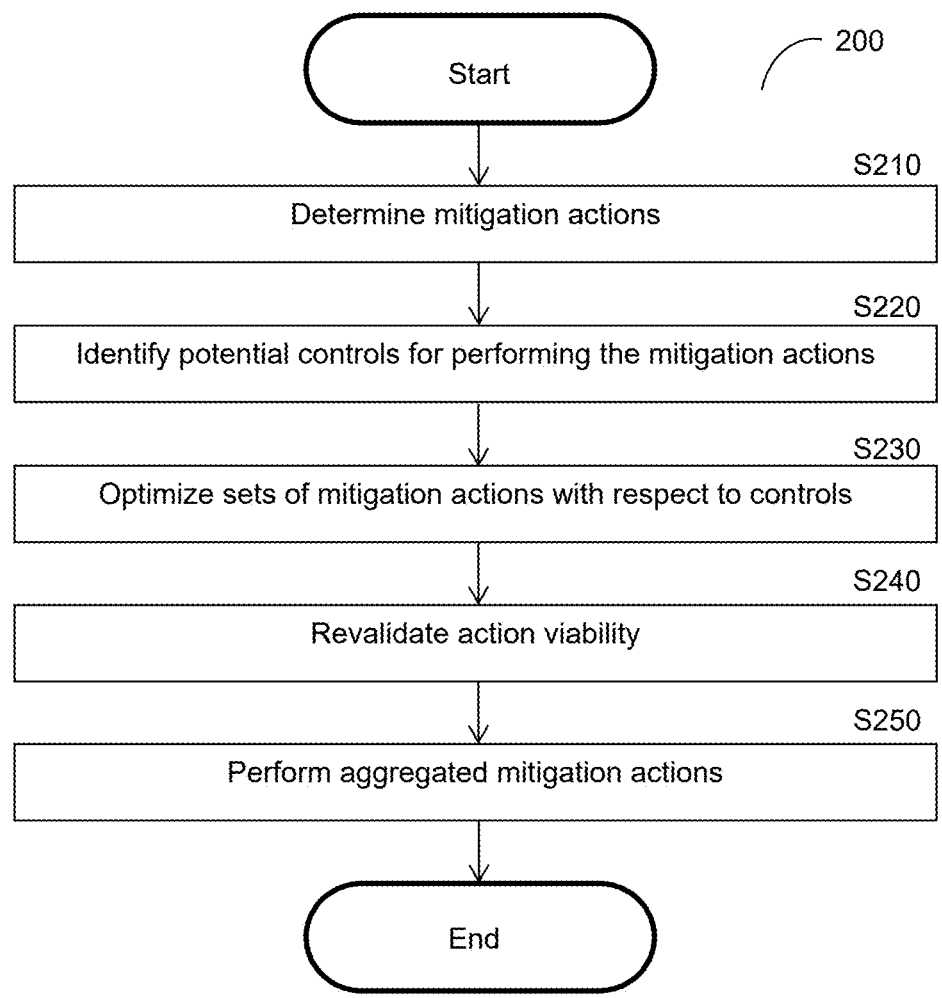
FIG. 2 is a flowchart illustrating a method for aggregating mitigation actions according to an embodiment.

FIG. 2 is a flowchart 200 illustrating a method for aggregating mitigation actions according to an embodiment. In an embodiment, the method is performed by the mitigator 130, FIGS. 1A-B.

At S210, mitigation actions to be performed are determined. In an embodiment, determining the mitigation actions to be performed includes applying one or more predetermined mitigation action determination rules based on alerts, policy violations, or other data indicating a potential cyber threat which might need to be mitigated. Moreover, such mitigation action determination rules may further define the types of mitigation actions, specific actions to be performed, or both, with respect to different alerts, policy violations, types of alerts, types of policy violations, and the like.

In some embodiments, the mitigation actions to be performed are determined based on predetermined identifiers indicated in data representing potential cyber threats. More specifically, the predetermined identifiers may be identifiers of known vulnerabilities, exposures, or other circumstances which may render assets within the computing environment exploitable. As a non-limiting example, the identifiers may be common vulnerabilities and exposures (CVEs), and each determined mitigation action is a mitigation action known to be useful for mitigating a respective CVE indicated among alerts, policy violations, or other data indicating a potential cyber threat. To this end, in a further embodiment, determining the mitigation actions includes accessing a mitigation knowledge base (e.g., the mitigation knowledge base 140, FIGS. 1A-B) storing predetermined associations between CVEs and mitigation actions known to be useful for mitigating their associated CVEs.

At S220, potential controls for performing the mitigation actions are identified. In an embodiment, one or more respective controls are identified for each mitigation action using a set of predetermined control identification rules. Such control identification rules may define types of controls or specific controls to be utilized for performing mitigation actions with respect to factors such as, but not limited to, type of mitigation action to be performed, resources which are indicated in alerts or violations to be mitigated (e.g., a resource indicated in an alert as being the target of a potential cyber threat or exhibiting anomalous behavior), location of the alert or violation (e.g., a relative location of a computing resource within a computing environment that triggered an alert or violation), a combination thereof, and the like.

More specifically, the potential controls may be identified as controls which are capable of implementing that mitigation action. As a non-limiting example, when a mitigation action includes blocking traffic to an asset, a potential control for realizing traffic blocking may be a firewall, and the mitigation action may be realized by deploying, configuring (e.g., adding a blacklist of networks), or turning on a firewall deployed inline between the asset and one or more other networks (e.g., between a private network through which the asset is accessible and a public network connected to the private network).

As discussed herein, identifying the controls which might be used to implement a given mitigation action allows for testing different combinations of configurations and deployments of controls, for example by running simulations as described below. This, in turn, allows for improving security of the network by optimizing sets of mitigation actions for maximum reduction of risk or otherwise to optimize security of the computing environment once the applicable sets of mitigation actions are performed.

At S230, the mitigation actions to be performed are aggregated into sets of mitigation actions and optionally optimized with respect to the potential controls. Each set of mitigation actions includes at least a subset of the mitigation actions to be performed. More specifically, in an embodiment, the mitigation actions are aggregated into sets which are defined with respect to respective controls such that the control or set of controls corresponding to each set of mitigation actions are to be used for performing the mitigation actions in its corresponding set in an aggregated manner. In other words, multiple composite mitigation actions among a subset of the mitigation actions to be performed by a given control may be aggregated into an aggregated mitigation action such that the result of performing the aggregated mitigation action includes the results that would have been achieved by performing each composite mitigation action individually. Each composite mitigation action is one of the mitigation actions of the set of mitigation actions to be aggregated.

In some embodiments, the sets may be ordered sets, i.e., where the set is defined further with respect to the order in which the mitigation actions among the set are performed. In such embodiments, optimizing the sets may include running simulations on these different order mitigation action sets which may include the same mitigation actions performed in a different order than each other. Such an embodiment may therefore further allow for identifying potential variations of mitigation action sets that may further optimize An example process for optimizing sets of mitigation actions is described further below with respect to FIG. 3.

At S240, action viability is revalidated with respect to each of the mitigation actions. In an embodiment, revalidating action viability includes verifying that each of the mitigation actions has not been performed. In a further embodiment, the revalidation may include applying revalidation rules defining circumstances in which a given mitigation action is viable or unviable. For example, a given mitigation action may be unviable when the mitigation action has already been performed (e.g., as determined by checking a configuration or deployment of a control), is redundant with another mitigation action, has been obviated (e.g., the mitigation action is to be performed on a certain control or with respect to a certain resource which is no longer part of the computing environment), and the like.

As a non-limiting example, while mitigation actions are being aggregated, certain individual mitigation actions may have been performed in the meantime. Any mitigation actions which were already performed may be removed from the sets of mitigation actions or otherwise mitigation actions which are redundant with already performed mitigation actions may be avoided. As another example, mitigation actions which have been obviated due to changes in the computing environment may be removed from the sets of mitigation actions. As a non-limiting example for such obviation, a mitigation action which includes modifying a configuration of a security control may be obviated when the security control has been removed from the computing environment such that altering the configuration of the security control would not affect the security of the computing environment.

In this regard, it is noted that many computing environments are constantly evolving and changing, particularly multiple actors (e.g., users, admins, engineers, etc.) are acting upon the computing environment in real-time. When changes are made to the computing environment, certain mitigation actions may become redundant or otherwise unnecessary by the time the mitigation actions are supposed to be performed. Accordingly, by revalidating action viability prior to mitigation, these redundant or otherwise unnecessary mitigation actions may be skipped, thereby conserving computing resources related to mitigation.

At S250, aggregated mitigation actions are performed. More specifically, one or more aggregate mitigation actions are performed based on the composite mitigation actions in each optimized set of mitigation actions. In an embodiment, performing the aggregated mitigation action includes sending a command, sending instructions, or otherwise causing the control for each aggregated mitigation action to implement the aggregated mitigation action. To this end, such a command or instructions may indicate actions for the control to take, configurations to be implemented, instances to deploy, or other data used to execute the aggregated mitigation action via configuring one or more controls, deploying one or more controls, or a combination thereof. The command or instruction may be sent to the control or to a computing entity configured to manage configuration of controls, deployment of controls, or both.

In an embodiment, the mitigation actions of a set of mitigation actions to be performed by a given control may be used as composite mitigation actions and aggregated into an aggregated mitigation action such that the result of performing the aggregated mitigation action includes the results that would have been achieved by performing each composite mitigation action among the set individually.

As a non-limiting example, an aggregated mitigation action may be aggregated based on multiple composite mitigation actions, where each of the composite mitigation actions would involve reconfiguring a control to block packets from a respective Internet Protocol (IP) address. The aggregated mitigation action may therefore include a single set of instructions that, when executed, cause reconfiguration of the security control to block packets from the respective IP addresses of the composite mitigation actions. To this end, such instructions may include or otherwise be generated based on a list including each of the IP addresses to be blocked.

Figure 3:
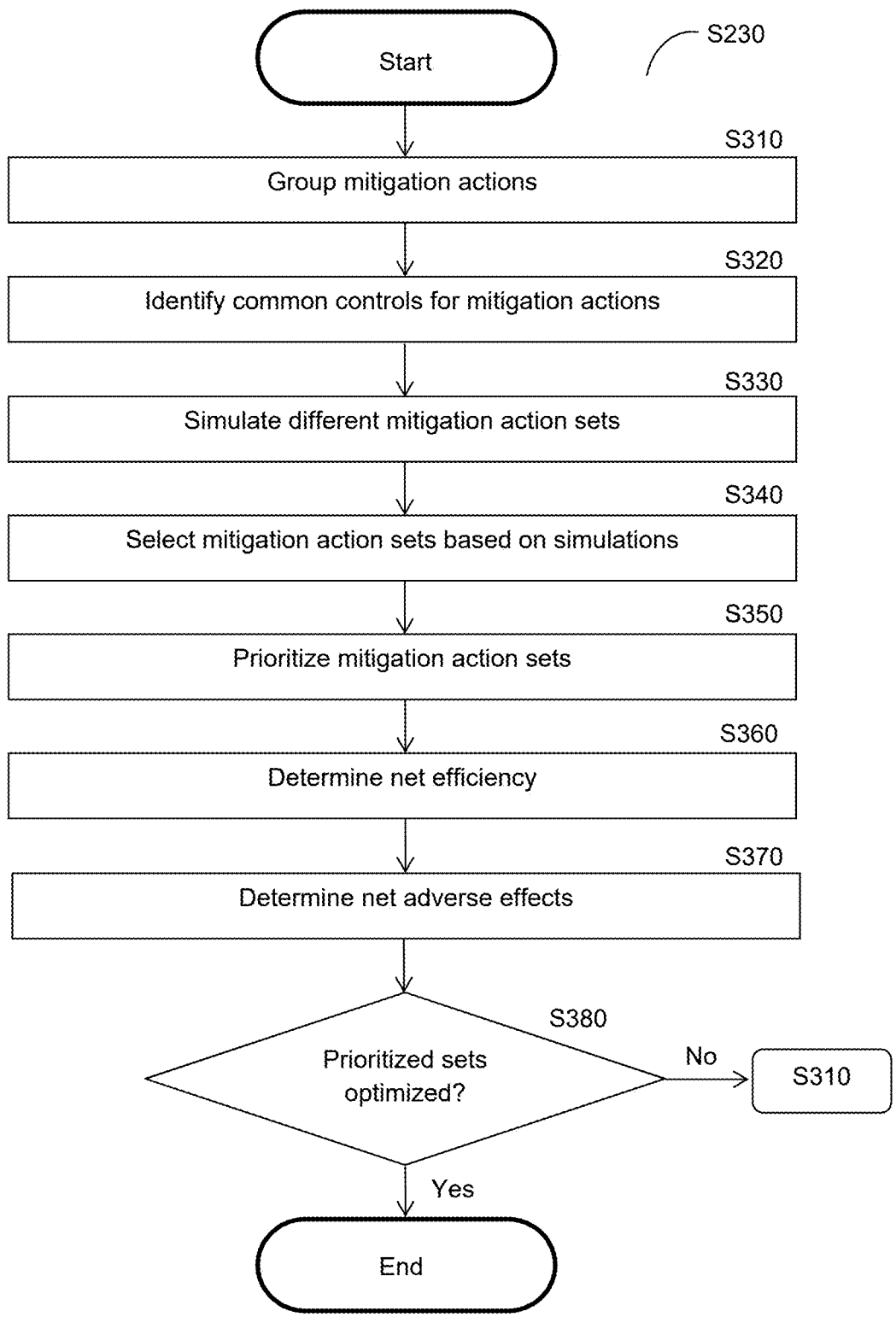
FIG. 3 is a flowchart illustrating a method for optimizing mitigation action sets according to an embodiment.

FIG. 3 is a flowchart S230 illustrating a method for optimizing mitigation action sets according to an embodiment.

At S310, mitigation actions to be performed are grouped into multiple candidate mitigation action sets. Each candidate mitigation action set includes a subset of the mitigation actions.

In some embodiments, at least some of the candidate mitigation action sets may share one or more mitigation actions in common. In a further embodiment, some of the candidate mitigation action sets include the same mitigation actions as other candidate mitigation action sets, but ordered differently. As a non-limiting example, one candidate mitigation action set may include mitigation actions A, B, and C, performed in order of A then B then C, while another candidate mitigation action set includes the same mitigation actions performed in order of C then B then A. Simulating differently ordered sets of mitigation actions may allow for further improving mitigation action aggregation by identifying different orders of mitigation actions which may reduce risk more than other orders of the same mitigation actions.

In an embodiment, the mitigation actions are grouped based on control features to be used to implement the mitigation actions. That is, mitigation actions which utilize the same type of control (e.g., firewall), which utilize a control deployed at the same location relative to the computing environment (e.g., deployed inline between an asset and one or more networks), which involve the same activity (e.g., blocking an Internet Protocol address), or a combination thereof, are grouped together. In a further embodiment, the mitigation actions are grouped based on both location and either type of control or type of control activity. In yet a further embodiment, the mitigation actions are grouped based on all three control features of location, type of control, and type of control activity.

The grouped mitigation actions may be used as candidate mitigation action sets which can be tested via simulation as discussed herein. Based on the results of the simulations, the mitigation action sets to be performed may be selected from among these groups of mitigation actions. As noted herein, the groupings of mitigation actions may be performed in aggregate by sending instructions for implementing multiple mitigation actions in each grouping to the same control or set of controls. Accordingly, by grouping mitigation actions based on control features, candidate mitigation action sets which are capable of being aggregated with respect to controls can be identified and tested. This allows for selecting the optimal mitigation action sets for aggregated performance.

As a non-limiting example, mitigation actions which involve blocking different Internet Protocol (IP) addresses from accessing a given asset may be grouped together. When the mitigation actions among the grouping are to be performed in an aggregated manner (i.e., when the grouping has been selected as a mitigation action set to be performed), a set of instructions listing each of the IP addresses and indicating that each of the listed IP addresses should be blocked) may be sent for use in reconfiguring the control (e.g., by sending the instructions to the control or to a system managing the control). Accordingly, multiple mitigation actions (blocking multiple IP addresses) may be realized via a single activity with respect to controls (i.e., transmitting one set of instructions) instead of sending separate instructions for each mitigation action.

At S320, potential controls for performing the groupings of mitigation actions are identified. The potential controls may be determined based on a type of each mitigation action, assets or systems affected by cyber threats to be mitigated via the mitigation actions, a combination thereof, and the like. More specifically, the potential controls identified at S320 include common controls, where each common control is common to two or more corresponding mitigation actions of a given mitigation action grouping such that the common control may be used to implement each of the two or more corresponding mitigation actions.

In an embodiment, the potential controls identified at S320 include existing controls deployed in a computing environment, instances of controls to be deployed in the computing environment, or both. The potential controls are selected such that the potential controls are capable of implementing at least a portion of each group of mitigation actions.

To this end, the potential controls may be identified based on location (e.g., a relative logical location within a given environment, network, or otherwise defined relative to other computing components such as a location of an existing control with respect to other components the control communicates with or a proposed location of a control to be deployed with respect to computing components that the control will be connected to). For example, a control may be selected based on locations where the control would be able to access or control access to an asset to be protected by one or more of the mitigation actions.

The potential controls may be identified based further on capabilities (e.g., capabilities of an existing control, capabilities of a control after reconfiguration, proposed capabilities of a control to be deployed, etc.). As a non-limiting example, when the mitigation actions in a given group include blocking traffic, a control which is configured to block at least some kinds of traffic is identified as one of the controls.

At S330, simulations are run in order to simulate different candidate mitigation action sets. In other words, S330 includes simulating the candidate mitigation action sets in order to yield a set of simulation results. In an embodiment, running each simulation includes determining a control setup and analyzing risk with respect to risk amplifiers as well as controls deployed, configured, or both, according to the control setup. More specifically, the groupings of mitigation actions to be performed are analyzed to determine resulting configurations, deployments, or both, of controls which would be realized by implementing each grouping of mitigation action.

In an embodiment, the results of the simulation include a risk score for each mitigation action set indicating a degree of risk of the resulting control setup (e.g., configurations of controls, deployments of controls, or a combination thereof). The risk scores may be utilized to compare and contrast security of different control setups, which may be utilized to select mitigation action sets in order to meet certain goals as described further below. As a non-limiting example, a mitigation action set which results in a lower risk score may be selected over a mitigation action set that has a higher risk score. As another non-limiting example, a mitigation action set which has a higher but similar risk score (e.g., at most a threshold amount different than another risk score of another mitigation action set) may be selected over the mitigation action set with a lower but similar risk score when the higher risk score mitigation action set can be performed more efficiently (e.g., with fewer instructions, using fewer controls, etc.).

By analyzing various aspects of risk reduction for a given set of controls, a risk score which accounts for both risk raising aspects (risk amplifiers) as well as risk reducing aspects (effects of controls) can be determined for various potential combinations, deployments, and configurations of controls. This, in turn, may be utilized to determine which controls will provide the most improvement to cybersecurity for the computing environment, and can be utilized to aid in selecting controls for use in implementing aggregated mitigation actions. That is, controls selected based on results of the simulations may be deployed or otherwise identified and utilized to mitigate the potential cyber threats as discussed herein.

In some embodiments, the simulations may be run using an applicable risk scoring process which scores risk of different deployments, configurations, or combinations thereof. That is, in such an embodiment, running the simulation for each potential mitigation action sets includes determining a set of deployments, configurations, or a combination thereof, which will result from each mitigation action set, and determining a risk score for each such combination of deployments and configurations.

The result of the simulation for each potential mitigation action set may therefore include the risk score determined in this manner, which may be utilized to select mitigation action sets for use in performing aggregated mitigation actions. That is, potential mitigation action sets having lower risk scores may be used instead of potential mitigation action sets having higher risk scores. In some embodiments, when two potential mitigation action sets are incompatible (e.g., when their respective deployments and configurations are different in a manner that makes it impossible to implement both simultaneously), then the potential mitigation action set with the lower risk score may be utilized. Alternatively or in combination, when the difference between the risk scores for two potential mitigation action sets is below a predetermined threshold, the potential mitigation action set to be implemented may be selected based on other factors such as how readily the potential mitigation action sets can be aggregated with other potential mitigation action sets (e.g., based on the ability to perform multiple mitigation actions among the sets via a single action).

More specifically, such an applicable risk scoring process may include analyzing risk amplifiers as well as security controls. The risk amplifiers include aspects of deployments and configurations which may increase the likelihood (e.g., likelihood of a security failure occurring), impact (i.e., degree of harm if a security failure occurs), or both, of a security failure. Likewise, the security controls may include cybersecurity tools or other control computing components which may reduce the likelihood, impact, or both, of a security failure.

An example process for risk scoring which may be utilized for running the simulations is described further below with respect to FIG. 5.

At S340, mitigation action sets to be performed are selected based on results of the simulations. In an embodiment, the mitigation action sets are selected based on the risk scores. In a further embodiment, and as noted above, the risk scores account for both risk amplifiers as well as risk reductions realized due to controls. For example, the risk amplifiers may be determined based on aspects of the computing environment related to accessibility of an asset such as, but not limited to, connections between components, connections to networks (e.g., an asset which is accessible via a public-facing network may have an additional risk amplifier over an asset which is only accessible to private networks), sensitivity (e.g., predetermined sensitivity indicators which are preassigned to assets, or sensitivities determined using predefined sensitivity rules which associate certain sensitivity levels with corresponding types of assets), combinations thereof, and the like.

In a further embodiment, the mitigation action sets to be performed are determined based further on efficiency of their respective composite mitigation actions, efficiency of the combination of their composite mitigation actions, or both. To this end, in such an embodiment, selecting the mitigation action sets further includes analyzing an efficiency of each mitigation action set. In yet a further embodiment, the efficiency is analyzed with respect to security controls to be used for implementing each mitigation action set. Accordingly, efficiency of each mitigation action set may be determined based on factors such as, but not limited to, resources required to implement changes to the control setup (e.g., deploying a new control may require more resources than reconfiguring an existing control), a number of control changes (e.g., changes in configuration or deployment) which would be used to implement each mitigation action set (e.g., using a higher number of controls would require more resources than using a lower number of controls), a number of actions to be performed by the controls (e.g., more actions would require more computing resources), a combination thereof, a portion thereof, and the like. Alternatively or in addition, efficiency of each mitigation action set may be determined based on how efficient each composite mitigation action is among the set.

Alternatively or in combination with determining mitigation action sets to be performed based on efficiency, the mitigation action sets to be performed may be determined based further on effectiveness of the composite mitigation actions among the mitigation action sets. As a non-limiting example, an effectiveness score may be determined for each mitigation action based on a predetermined known effectiveness of the mitigation action and, optionally, a known effectiveness of the mitigation action for mitigating a certain type of cyber threat (e.g., a type of cyber threat defined with respect to a threat identifier such as, but not limited to, common vulnerabilities and exposures).

In another embodiment, the mitigation action sets to be performed may be determined based further on potentially dangerous side effects of implementing mitigation actions among the mitigation action sets. That is, some mitigation actions may carry side effects which could be harmful to the computing environment with respect to other aspects of cybersecurity, disruption to or other interference with service, both, and the like. For example, a mitigation action may avoid a certain type of threat but increase exposure to other types of threats. As another example, a mitigation action may improve security but may prevent or hinder certain activities needed to deliver services effectively. In other words, some mitigation actions may present a certain degree of risk with respect to reduction of risk amplifiers via controls, but may introduce new risks which may increase the overall risk to the computing environment.

As noted above, in some embodiments, the side effects may further include adverse effects which might impact performance of systems or services operating in the computing environment. To this end, in such an embodiment, selecting the mitigation action sets may further include determining an impact score for each mitigation action set which accounts for one or more of performance impact, disruption impact, accuracy impact, or a combination thereof. These impact scores are utilized to select the mitigation action sets to be performed. An example process for analyzing impact of potential adverse effects of a mitigation action set is described further below with respect to FIG. 4.

In some embodiments, the efficiency of each mitigation action, effectiveness of each mitigation action, potential side effects of each mitigation action, or a combination thereof, may be determined based on predetermined data associated with each mitigation action. Such data may be stored in a mitigation knowledge base (e.g., the mitigation knowledge base, FIGS. 1A-B). To this end, in such an embodiment, selecting the mitigation action sets to be performed further includes accessing a mitigation knowledge base storing predetermined associations between mitigation actions and respective combinations or sub-combinations of efficiency values, effectiveness values, known side effects or values representing potential degrees of harm for known side effects, combinations thereof, and the like. Moreover, the efficiency, effectiveness, and potential side effects of each mitigation action set (e.g., as determined based on the composite mitigation actions in set) may be further utilized for prioritizing the mitigation action sets as discussed below.

In this regard, it is noted that the optimal mitigation action set to be used in a given context may depend on factors other than how efficiently its composite mitigation actions can be performed when aggregated. Mitigation action sets which can be performed efficiently but are not effective at mitigating a particular type of threat or which cause harmful side effects can actually reduce the security of a computing environment. Accordingly, accounting for factors such as effectiveness and potential harm of side effects when selecting mitigation action sets to be performed allows for further improving cybersecurity in the computing environment.

At S350, the selected sets are prioritized. That is, the selected mitigation action sets are prioritized such that at least some of the selected sets are implemented prior to others, for example, by sending the instructions for some mitigation action sets before sending the instructions for otherwise, or otherwise by causing the mitigation actions to be implemented in a certain order (e.g., by including in the instructions for each mitigation action set one or more criteria for beginning implementation that are met when another mitigation action set has been completed, by including time markers indicating times at which each mitigation action set is to be performed, by adding instructions to a queue and sending the instructions based on their order in the queue, a combination thereof, and the like. In some implementations, some of the selected sets may be implemented in parallel, for example, by sending their respective instructions simultaneously or otherwise to be executed at the same time.

In some embodiments, the sets may be prioritized based on one or more predetermined prioritization rules. The predetermined prioritization rules may be defined with respect to effects of different mitigation actions on an organization. As a non-limiting example, such prioritization rules may be defined with respect to business criticality based on the resources which may be secured using respective mitigation actions (e.g., to prioritize mitigation actions to be performed with respect to resources which are among a predetermined list of operations-critical assets over mitigation actions to be performed with respect to other resources).

To this end, in some implementations, each asset may be associated with a predetermined value (e.g., a number on a scale of 1 to 5) indicating operations criticality (e.g., how important that asset is to maintaining service, how sensitive the data held by the asset is, how much harm can be accomplished by unauthorized access to the asset, or a combination thereof) or otherwise representing a degree to which the asset should be prioritized as compared to other assets. Alternatively, the prioritization values may be determined based on, for example, asset criticality values determined as discussed further below with respect to FIG. 5.

In some implementations, determining the prioritization may include applying a weighted score to each asset to be protected and determining whether a given set of assets has a higher cumulative weighted score than another set of assets. As a non-limiting example, assets having a predetermined prioritization value of 1 may be assigned a weighted score of 0.01, and assets having a predetermined prioritization value of 5 may be assigned a weighted score of 1. In such an example, the effect of mitigating threats to one prioritization value 5 asset would be equal to the cumulative effect of mitigating threats to one hundred prioritization value 1 assets.

In this regard, it is noted that optimizing effectiveness of mitigation actions may be further improved by utilizing relative asset importance to prioritize actions. Specifically, by considering factors such as asset criticality (e.g., as defined with respect to how many services the asset is used by, for what purpose the asset is used, etc.), it may be determined which mitigation actions would have the most effect on securing the environment, which may be utilized to make decisions about prioritizing finite computing resources needed to secure different assets.

In the example noted above, a single asset which is central to computing operations of an organization may have a prioritization value of 5 on a scale of 1 to 5. Mitigating potential threats to such a critical asset may have a larger effect in securing the organization than, for example, mitigating threats with respect to one thousand assets having respective prioritization values of 1. In such a case, prioritizing the prioritization value 5 asset over the prioritization value 1 assets may improve overall cybersecurity for the computing environment.

Likewise, even when a given asset has the highest possible prioritization value, mitigating threats to that asset may have less effect on cybersecurity for the organization as compared to mitigating threats to one million other assets having prioritization values of 1, particularly when the million other assets can be secured with one or only a few aggregated mitigation actions (e.g., when their mitigation actions can be aggregated and implemented via a single set of instructions to a single control).

At S360, a net efficiency of the prioritized combination of mitigation action sets is determined. In an embodiment, the net efficiency is determined based on an efficiency of each mitigation action set among the prioritized combination of mitigation action sets. To this end, in some embodiments, the net efficiency of a prioritized combination of mitigation action sets may be determined as a sum or weighted sum of efficiency values for respective mitigation action sets among the prioritized combination of mitigation action sets. Alternatively or in addition, the net efficiency for each mitigation action set may be determined based on an efficiency gained for performing the composite mitigation actions of the set (e.g., based on a number of control instructions needed to implement the mitigation actions of the set).

At S370, net adverse effects of mitigation actions are determined. In an embodiment, the net adverse effects are determined based on potential adverse effects of each mitigation action set among the prioritized combination of mitigation action sets. In some embodiments, the net adverse effects of a prioritized combination of mitigation action sets may be realized as a net impact score, which may be determined as a sum or weighted sum of impact scores for respective mitigation action sets among the prioritized combination of mitigation action sets. As noted above, the potential adverse effects of a given set of mitigation actions may be determined as described further below with respect to FIG. 4.

At S380, it is checked whether the prioritized sets have been optimized and, if not, execution continues with S310; otherwise, execution terminates. In an embodiment, checking for optimization includes applying optimization rules defining whether a given set of mitigation actions is optimal with respect to one or more factors such as risk (e.g., as defined with respect to risk scores), net efficiency (e.g., as defined with respect to net efficiency values), net adverse effects (e.g., as defined with respect to a net impact score), a combination thereof, and the like.

In a further embodiment, the optimization rules define one or more thresholds which must be met in order for a prioritized combination of mitigation action sets to be determined as optimized. As non-limiting examples, the optimization rules may define one or more of a maximum risk threshold, a minimum net efficiency threshold, and a maximum net impact score threshold.

In some embodiments, the prioritization may begin naively (e.g., to maximize mitigation efficiency or to minimize adverse effects regardless of the other). That is, in a first iteration, a prioritized combination of mitigation action sets may be selected such that the mitigation action sets have a net efficiency that is highest among potential combinations of mitigation action sets or such that the mitigation action sets have a net impact score that is lowest among potential combinations of mitigation action sets.

In a further embodiment, subsequent iterations may be performed in order to optimize for the other factor, i.e., to optimize impact of adverse effects when an initial iteration maximized efficiency or to optimize efficiency when an initial iteration minimized impact of adverse effects. In other words, changes to the combination of mitigation action sets to be used may be selected in order to improve the previously unoptimized factor, for example, based on known efficiencies or impacts of the respective composite mitigation actions of each mitigation action set. In yet a further embodiment, the subsequent iterations may be performed until one or more thresholds are met. As a non-limiting example, when efficiency is initially optimized, iterations may be performed until net impact score falls below a predetermined threshold, with each iteration possibly decreasing efficiency but also decreasing impact.

Figure 4:
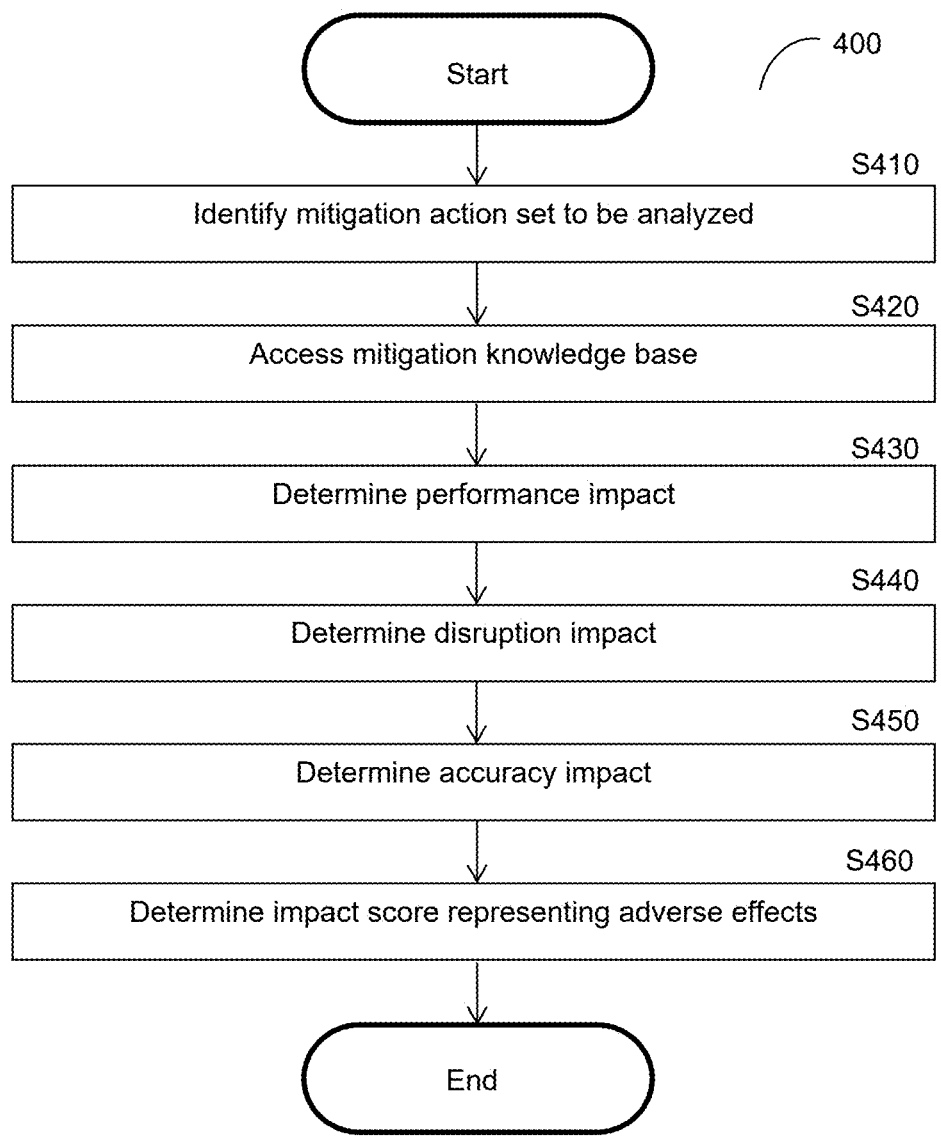
FIG. 4 is a flowchart illustrating a method for determining adverse effects of mitigation action sets according to an embodiment.

FIG. 4 is a flowchart 400 illustrating a method for determining adverse effects of mitigation action sets according to an embodiment. In an embodiment, the method is performed by the mitigator 130, FIGS. 1A-B.

At S410, a mitigation action set to be analyzed is identified. In an embodiment, the mitigation action set to be analyzed is among candidate mitigation action sets which may be performed in a computing environment (e.g., the mitigation action sets which are simulated as discussed above).

At optional S420, a mitigation knowledge base is accessed based on the mitigation action set to be analyzed. Such a mitigation knowledge base may store predetermined data related to different aspects of impact such as performance impact, disruption impact, and accuracy impact. This predetermined data may be analyzed to determine the potential impacts of different mitigation actions, and may further be extrapolated based on a number of computing entities (e.g., components or systems) which might be affected by each mitigation action. As a non-limiting example, each aspect of potential impact may be expressed as a numerical value that represents a potential impact on each computing entity, and each impact value per computing entity may be multiplied by the number of computing entities which would be affected by the respective mitigation action in order to determine a cumulative impact value for that aspect across all affected computing entities.

At S430, performance impact is determined. In an embodiment, determining the performance impact includes determining a composite performance impact value for each composite mitigation action of the mitigation action set, and determining a combined performance impact value for the mitigation action set based on the composite performance impact values for the set. As noted above, the composite performance impact values may be determined based on known impacts on performance, for example, predetermined values representing respective impacts on performance for different types of mitigation actions stored in a mitigation knowledge base.

In an embodiment, the performance impact may be determined with respect to consumption, availability, or both. That is, certain sets of mitigation actions may prevent or otherwise mitigate a cyber threat, but cause increased consumption of computing resources or interfere with availability of one or more computing resources. Accordingly, the performance impact for a given mitigation action set may be realized as a value representing a degree of impact on consumption, availability, or a combination thereof (e.g., a combined value representing impacts on both consumption and availability). Such a value may be determined based on, for example but not limited to, data stored in a mitigation knowledge based storing known associations between mitigation actions and impacts on performance.

At S440, disruption impact is determined. In an embodiment, determining the disruption impact includes determining a composite disruption impact value for each composite mitigation action of the mitigation action set, and determining a combined disruption impact value for the mitigation action set based on the composite disruption impact values for the set. As noted above, the composite disruption impact values may be determined based on known impacts on disruption, for example, predetermined values representing respective impacts on disruption for different types of mitigation actions stored in a mitigation knowledge base.

In an embodiment, the disruption impact may be determined with respect to packet loss. That is, disruption to service may be measured as a number of packets lost when implementing a given set of mitigation actions. Accordingly, the disruption impact for a given mitigation action set may be realized as a value representing a relative amount of packets which will be lost when implementing the mitigation action set. Such a value may be determined based on, for example but not limited to, data stored in a mitigation knowledge based storing known associations between mitigation actions and proportions of lost packets (e.g., relative to total numbers of lost packets) or other proportion of lost traffic (e.g., a percentage of traffic lost).

At S450, accuracy impact is determined. In an embodiment, determining the accuracy impact includes determining a composite accuracy impact value for each composite mitigation action of the mitigation action set, and determining a combined accuracy impact value for the mitigation action set based on the composite accuracy impact values for the set. As noted above, the composite performance impact values may be determined based on known impacts on accuracy, for example, predetermined values representing respective impacts on accuracy for different types of mitigation actions stored in a mitigation knowledge base.

In an embodiment, the accuracy impact is determined with respect to an expected false detection rate. That is, impacts on accuracy may be measured with respect to changes in false detection rate, e.g., false positives, false negatives, or both. Accordingly, the disruption impact for a given mitigation action set may be realized as a value representing a degree to which false detections will occur after implementing the mitigation actions of the mitigation action set. Such a value may be determined based on, for example but not limited to, data stored in a mitigation knowledge based storing known associations between mitigation actions and changes in rates of false detection.

At S460, an impact score is determined based on one or more of the performance impact, the disruption impact, and the accuracy impact. In some embodiments, each impact is represented as a respective value (e.g., a score), and the impact score is determined based on these values (e.g., as an average or cumulative score).

In this regard, it is noted that adverse effects on other computing entities may interfere with activities occurring in a computing environment such that naively analyzing mitigation action sets for efficiency, or even efficiency and security, would result in at least some situations where the mitigation actions overall improve security of the computing environment but severely interfere with operations. Analyzing impact as discussed above helps to enable effectively automating mitigation actions. That is, an automated system which does not account for impact on systems and services in the computing environment would implement mitigation actions that secure the environment but prevent normal operations, and may be incapable of identifying that performance has been negatively affected or may otherwise be uncapable of automatically fixing performance issues. An automated system which further accounts for potential adverse effects when selecting mitigation action sets to be performed may therefore allow for securing the computing environment while reducing the likelihood that other systems and services will be impacted.

Figure 5:
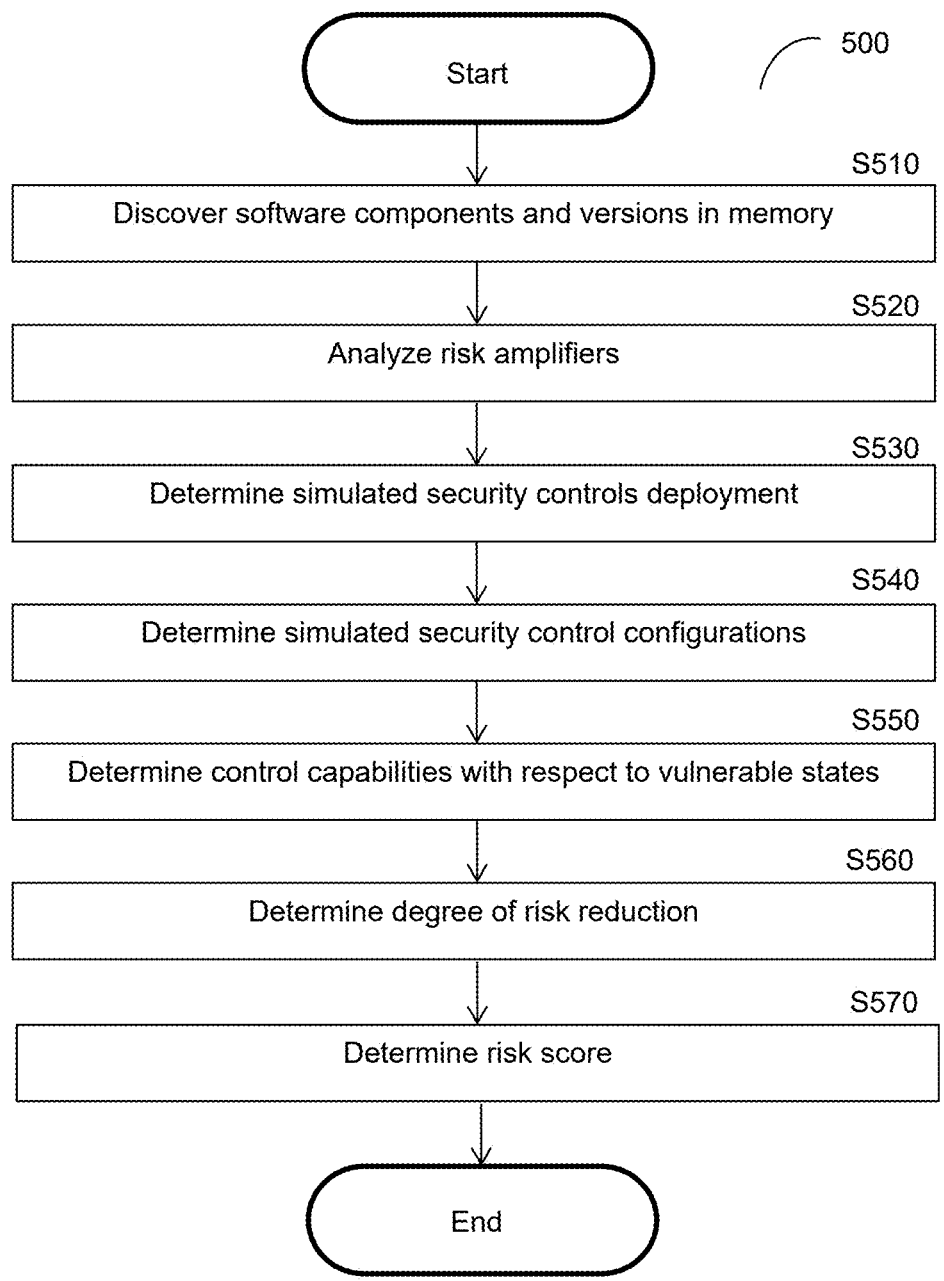
FIG. 5 is a flowchart illustrating a method for simulating risk of mitigation action sets according to an embodiment.

FIG. 5 is a flowchart 500 illustrating a method for simulating risk of mitigation action sets according to an embodiment. In an embodiment, the method is performed by the mitigator 130, FIGS. 1A-B.

At S510, software components, versions of software components, or both, are discovered in-memory. In an embodiment, discovering such components and versions includes performing an analysis of data in-memory. More specifically, in some embodiments, the analysis may be performed at least with respect to libraries loaded into memory. That is, software components may be discovered by identifying libraries loaded into memory, where the software components may utilize certain libraries or combinations of libraries at runtime such that each software component corresponds to a respective library or combination of libraries.

By analyzing software components discovered via in-memory analysis as described herein, data in-memory can be leveraged in order to analyze impact or risk with respect to actual real-time activities rather than solely to categorize software being run in an environment.

It should be noted that S510 is described with respect to discovering software components in-memory, but that in at least some embodiments, additional software components may be discovered outside of in-memory analysis, for example via static scan of program files or other data stored in non-memory data locations.

At S520, potential risk amplifiers are analyzed. The risk amplifiers are factors which amplify or otherwise increase risk of harm by potential vulnerable states.

In an embodiment, analyzing the potential risk amplifiers includes performing an impact analysis in order to determine one or more impact-related risk amplifiers. The results of the impact analysis may be used as risk amplifiers or otherwise may be utilized in order to determine risk amplifiers to be used in determining the applicable scores.

In addition to risk amplifiers related to impact, in some embodiments, analyzing the potential risk amplifiers may include applying one or more additional risk amplifiers based on factors such as, but not limited to, asset criticality (e.g., operations criticality as discussed above). The asset criticality is based on the potential impact of harm which would be caused by malicious access to one or more assets which are accessible to a software component corresponding to a given vulnerable state. To this end, the asset criticality may be a predetermined value for each software component, or may be determined by applying one or more asset criticality determination rules for each software component. The asset criticality determination rules may be defined with respect to factors such as, but not limited to, tags in an asset inventory (e.g., by identifying predetermined tags known to indicate criticality), name analysis (e.g., by applying predetermined name criticality analysis rules), user inputs (e.g., based on user inputs explicitly indicating that an asset is critical), combinations thereof, and the like.

At S530, deployments of simulated security controls are determined. In an embodiment, determining the deployments of the simulated security controls includes analyzing the mitigation actions to be simulated in order to determine deployments of security controls which would result from implementing the mitigation actions. More specifically, the mitigation actions may be analyzed with respect to predetermined portions of instructions (e.g., certain predetermined verbs in code) of the mitigation actions known to indicate deployment, as well as any location indicators or any other data indicating how the controls are to be deployed in the instructions for each mitigation action. The deployments determined in this manner are used for determining risk scores, thereby realizing the simulation as discussed further below.

In this regard, it is noted that the deployment of certain security controls with respect to certain software components may mitigate the likelihood that vulnerable states will cause harm at runtime or otherwise mitigate a degree of harm such that even a potentially high impact vulnerable state (i.e., a vulnerability which would cause a large amount of harm if exploited) may present a lower overall degree of risk (e.g., because there are appropriate security controls deployed to reduce the likelihood of a successful exploit or to prevent widespread harm even if exploitation is successful).

At S540, configurations of the simulated security controls are determined. In an embodiment, determining the configurations of the simulated security controls includes analyzing the mitigation actions to be simulated in order to determine configurations of security controls which would result from implementing the mitigation actions. More specifically, the mitigation actions may be analyzed with respect to predetermined portions of instructions (e.g., certain predetermined verbs in code) of the mitigation actions known to indicate changes in configuration, as well as any data indicating how the controls are to be reconfigured in the instructions for each mitigation action. The configurations determined in this manner are used for determining risk scores, thereby realizing the simulation as discussed further below.

In an embodiment, the configurations may be determined with respect to predetermined sets of configuration settings. Such configuration settings may be a predetermined set of configuration settings for each type of security control, may be defined for different kinds of vulnerable states (e.g., different CVEs), combinations thereof, and the like. The configurations may be utilized to determine the degree of risk reduction, and may further be analyzed based on historical risk reduction for different kinds of vulnerable states. As a non-limiting example, configurations which historically were effective at avoiding or mitigating cyber threats with respect to a certain kind of vulnerable state may be determined as effective against that kind of vulnerable state such that risk is reduced with respect to the same kind of vulnerable state when those configurations are present.

At S550, control capabilities are determined with respect to one or more vulnerable states, i.e., vulnerable states in or related to one or more assets to be secured using the mitigation actions.

In an embodiment, the control capabilities of the security controls are determined with respect to one or more categories of vulnerable states. In a further embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain categories of vulnerable states. Such scoring of the effectiveness of various capabilities of security controls in avoiding or mitigating vulnerable states may be utilized, for example, in order to determine a total risk reduction for the security controls (e.g., based on any or all of presence of security controls, capabilities with respect to categories of vulnerable states, capabilities with respect to specific types of vulnerable states, combinations thereof, and the like), which in turn may be utilized for determining risk scores as discussed herein.

In yet a further embodiment, determining the control capabilities includes determining a type of trigger for each security control defined with respect to one or more networks. In a further embodiment, the type of trigger is either triggerable via those networks or triggerable only locally (e.g., via endpoints but not via external systems via those networks). In yet a further embodiment, the type of trigger for each security control may be determined based further on a reachability analysis (e.g., a reachability analysis as described further above). The type of trigger for each security control may be utilized, for example, in order to determine capability scores. As a non-limiting example, predetermined capability scoring rules may score security controls which are capable of being triggered via networks higher (i.e., representing that the security controls are more capable of mitigating vulnerable stats) than security controls which are only capable of being triggered locally.

In another embodiment (alternatively or in combination with determining capabilities with respect to categories of vulnerable states), the determined control capabilities may include capabilities defined with respect to specific types of vulnerable states. Such capabilities may be capabilities defined as being utilized to prevent or otherwise mitigate exploitation of the vulnerable state. In a further embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain specific types of vulnerable states. A specific type of vulnerable state may be a particular known vulnerability or exploit, for example, as defined in a set of common vulnerabilities and exploits (CVEs).

As a non-limiting example for a security control in the form of a web application firewall (WAF), a WAF with rules or other settings known to block a specific type of vulnerable state (e.g., a specific CVE) is determined to be capable of mitigating that type of vulnerable state. As another non-limiting example for a WAF security control, a WAF with a generic rule that blocks certain kinds of attack vectors (e.g., structured query language injections) known to be associated with a specific CVE is determined to be capable to mitigating that CVE.

At S560, a degree of risk reduction is determined based on the deployments of the security controls, the configurations of the security controls, the capabilities with respect to vulnerability categories, the capabilities for mitigating specific types of vulnerabilities, or a combination thereof. In an embodiment, determining the degree of risk reduction includes determining one or more risk reduction scores representing a degree of risk reduction for each security control, a combined score representing an aggregate degree of risk reduction for the security controls, and the like. Such scores may be utilized to determine an applicable risk score.

At S570, a risk score is determined for the simulated security controls based on the risk amplifiers and the degree of risk reduction. In some implementations, a value (e.g., a risk reduction score) representing the degree of risk reduction may be subtracted from a value (e.g., a risk amplifier score) representing the risk amplifiers in order to determine a value representing the overall degree of risk of a given deployment (i.e., accounting for circumstances that amplify risk as well as circumstances that mitigate risk). As noted above, because this value is determined based on a proposed combination of control deployments and configurations, the overall effect of a given set of controls on a potential risk may be analyzed.

This overall effect, in turn, may aid in aggregating mitigation actions with respect to controls by identifying sets of control configurations and deployments that achieve certain goals with respect to risk such as, but not limited to, minimizing risk, balancing risk against efficiency or effectiveness, and the like. For balancing risk with efficiency or effectiveness, in some embodiments, a maximum tolerable risk score threshold may be predetermined and utilized to determine whether a given set of mitigation actions, even if possible to perform efficiently and effectively, would raise the risk above this threshold and therefore cannot be utilized as the optimal set of mitigation actions. Likewise, differences in risk scores between combinations of potential configurations and deployments of controls which are small (e.g., below a predetermined threshold) may be determined as having minimal effect on risk such that a set of mitigation actions which results in a higher risk combination of configurations and deployments (i.e., higher but within a threshold difference) may be selected over a set of mitigation actions when the higher risk set of mitigation actions can be performed more efficiently (e.g., using fewer controls, with fewer actions, a combination thereof, etc.) or more effectively (e.g., a degree to which the mitigation action is known to effectively mitigate certain types of cyber threats) than the lower risk set of mitigation actions.

Figure 6:
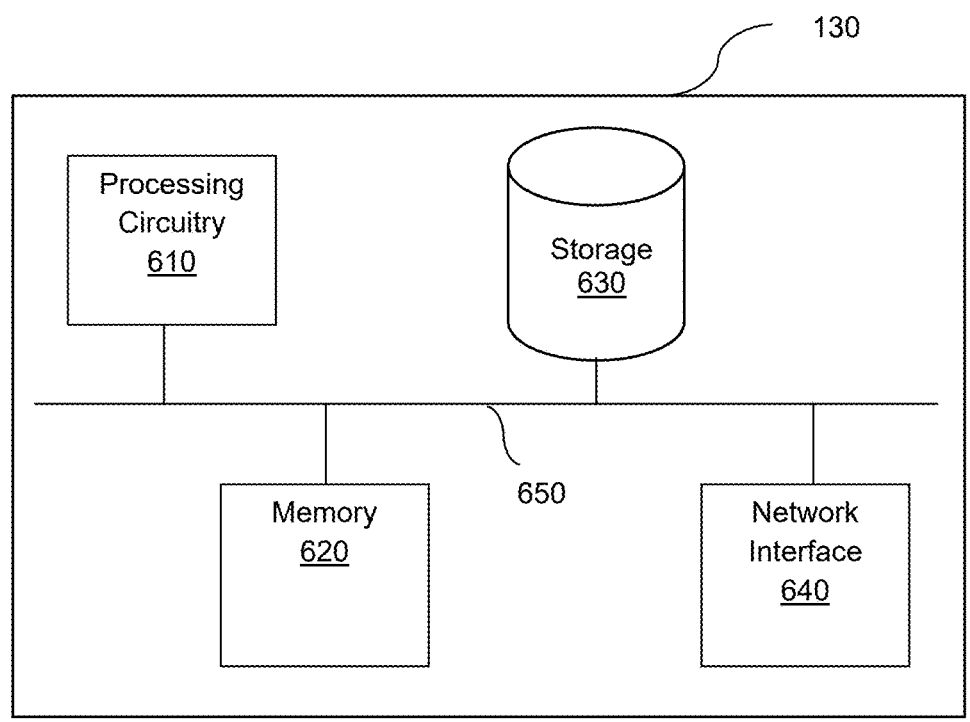
FIG. 6 is a schematic diagram of a mitigator according to an embodiment.

FIG. 6 is an example schematic diagram of a mitigator 130 according to an embodiment. The mitigator 130 includes a processing circuitry 610 coupled to a memory 620, a storage 630, and a network interface 640. In an embodiment, the components of the mitigator 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the mitigator 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for mitigating cyber threats, comprising:
aggregating a plurality of mitigation actions into a plurality of mitigation action sets with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score of each candidate mitigation action set is determined based on at least one risk amplifier of a computing environment for which the plurality of mitigation actions is to be performed;
prioritizing the plurality of mitigation action sets based on a predetermined operations criticality of each of a plurality of respective assets; and
performing the plurality of mitigation action sets via the at least one security control, wherein performing each mitigation action set includes sending a respective set of instructions, wherein the set of instructions sent for each mitigation action set causes a respective security control of the at least one security control to implement each mitigation action of the mitigation action set.

2. The method of claim 1, wherein aggregating the plurality of mitigation actions further comprises:
grouping the plurality of mitigation actions into a plurality of candidate mitigation action sets;
simulating the plurality of candidate mitigation action sets, wherein simulating the plurality of candidate mitigation action sets yields a set of simulation results; and
selecting the at least one mitigation action set from among the plurality of candidate mitigation action sets based on the set of simulation results.

3. The method of claim 2, wherein simulating the plurality of candidate mitigation action sets further comprises, for each of the plurality of candidate mitigation action sets:
determining a configuration and a deployment of a first security control of the at least one security control for the candidate mitigation action set; and
determining a degree of risk reduction for the candidate mitigation action set based on the determined configuration and the determined deployment of the first security control; and
determining a risk score for the candidate mitigation action set based on the determined degree of risk reduction for the candidate mitigation action set;
wherein the simulation results include the risk score determined for each of the plurality of candidate mitigation action sets.

4. The method of claim 2, further comprising:
determining an impact score for each of the plurality of candidate mitigation action sets, wherein the impact score for each candidate mitigation action set indicates a degree of impact of the candidate mitigation action set on at least one other computing entity, wherein the at least one mitigation action set is selected based further on the impact score determined for each of the plurality of candidate mitigation action sets.

5. The method of claim 2, wherein the at least one mitigation action set is selected based on further on an efficiency of each of the plurality of candidate mitigation action sets.

6. The method of claim 1, further comprising:
determining at least one mitigation action of the plurality of mitigation actions which has already been performed; and
removing the at least one mitigation action which has already been performed from the at least one mitigation action set.

7. The method of claim 1, wherein the subset of the plurality of mitigation actions for a first mitigation action set of the at least one mitigation action includes blocking a plurality of Internet Protocol addresses, wherein the set of instructions sent for the first mitigation action set causes the respective security control to block each of the plurality of Internet Protocol addresses.

8. A non-transitory computer readable medium having stored thereon instructions for causing a processing circuitry to execute a process, the process comprising:
aggregating a plurality of mitigation actions into a plurality of mitigation action sets with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score of each candidate mitigation action set is determined based on at least one risk amplifier of a computing environment for which the plurality of mitigation actions is to be performed;
prioritizing the plurality of mitigation action sets based on a predetermined operations criticality of each of a plurality of respective assets; and
performing the plurality of mitigation action sets via the at least one security control, wherein performing each mitigation action set includes sending a respective set of instructions, wherein the set of instructions sent for each mitigation action set causes a respective security control of the at least one security control to implement each mitigation action of the mitigation action set.

9. A system for mitigating cyber threats, comprising:
a processing circuitry; and
a memory, the memory containing instructions that, when executed by the processing circuitry, configure the system to:
aggregate a plurality of mitigation actions into a plurality of mitigation action sets with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score of each candidate mitigation action set is determined based on at least one risk amplifier of a computing environment for which the plurality of mitigation actions is to be performed;
prioritize the plurality of mitigation action sets based on a predetermined operations criticality of each of a plurality of respective assets; and
performing the plurality of mitigation action sets via the at least one security control, wherein performing each mitigation action set includes sending a respective set of instructions, wherein the set of instructions sent for each mitigation action set causes a respective security control of the at least one security control to implement each mitigation action of the mitigation action set.

10. The system of claim 9, wherein the system is further configured to:
group the plurality of mitigation actions into a plurality of candidate mitigation action sets;
simulate the plurality of candidate mitigation action sets, wherein simulating the plurality of candidate mitigation action sets yields a set of simulation results; and
select the at least one mitigation action set from among the plurality of candidate mitigation action sets based on the set of simulation results.

11. The system of claim 10, wherein the system is further configured to, for each of the plurality of candidate mitigation action sets:
determine a configuration and a deployment of a first security control of the at least one security control for the candidate mitigation action set; and
determine a degree of risk reduction for the candidate mitigation action set based on the determined configuration and the determined deployment of the first security control; and
determine a risk score for the candidate mitigation action set based on the determined degree of risk reduction for the candidate mitigation action set;
wherein the simulation results include the risk score determined for each of the plurality of candidate mitigation action sets.

12. The system of claim 10, wherein the system is further configured to:
determine an impact score for each of the plurality of candidate mitigation action sets, wherein the impact score for each candidate mitigation action set indicates a degree of impact of the candidate mitigation action set on at least one other computing entity, wherein the at least one mitigation action set is selected based further on the impact score determined for each of the plurality of candidate mitigation action sets.

13. The system of claim 10, wherein the at least one mitigation action set is selected based on further on an efficiency of each of the plurality of candidate mitigation action sets.

14. The system of claim 9, wherein the system is further configured to:
   determine at least one mitigation action of the plurality of mitigation actions which has already been performed; and
   remove the at least one mitigation action which has already been performed from the at least one mitigation action set.

15. The system of claim 9, wherein the subset of the plurality of mitigation actions for a first mitigation action set of the at least one mitigation action includes blocking a plurality of Internet Protocol addresses, wherein the set of instructions sent for the first mitigation action set causes the respective security control to block each of the plurality of Internet Protocol addresses.

16. A method for mitigating cyber threats, comprising:
   aggregating a plurality of mitigation actions into at least one mitigation action set with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score determined for each candidate mitigation action set is determined based further on at least one risk amplifier of a computing environment for which the plurality of mitigation actions is to be performed;
   determining at least one mitigation action of the plurality of mitigation actions which has already been performed;
   removing the at least one mitigation action which has already been performed from the at least one mitigation action set; and
   performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

17. A non-transitory computer readable medium having stored thereon instructions for causing a processing circuitry to execute a process, the process comprising:
   aggregating a plurality of mitigation actions into at least one mitigation action set with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score determined for each candidate mitigation action set is determined based further on at least one risk amplifier of a computing environment for which the plurality of mitigation actions is to be performed;
   determining at least one mitigation action of the plurality of mitigation actions which has already been performed;
   removing the at least one mitigation action which has already been performed from the at least one mitigation action set; and
   performing the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

18. A system for mitigating cyber threats, comprising:
   a processing circuitry; and
   a memory, the memory containing instructions that, when executed by the processing circuitry, configure the system to:
   aggregate a plurality of mitigation actions into at least one mitigation action set with respect to at least one security control, wherein each mitigation action set includes a respective subset of the plurality of mitigation actions corresponding to a respective security control of the at least one security control, wherein the plurality of mitigation action sets is selected from among a plurality of candidate mitigation action sets based on a risk score of each candidate mitigation action set, wherein the risk score determined for each candidate mitigation action set is determined based further on at least one risk amplifier of a computing environment for which the plurality of mitigation actions is to be performed;
   determine at least one mitigation action of the plurality of mitigation actions which has already been performed;
   remove the at least one mitigation action which has already been performed from the at least one mitigation action set; and
   perform the at least one mitigation action set via the at least one security control, wherein performing each mitigation action set includes sending a respective set of instructions, wherein the set of instructions sent for each mitigation action set causes a respective security control of the at least one security control to implement each mitigation action of the mitigation action set.

\* \* \* \* \*